United States Patent
Tang et al.

(10) Patent No.: US 10,941,273 B2
(45) Date of Patent: Mar. 9, 2021

(54) GRAPHENE-CONTAINING MODIFIED LATEX AS WELL AS PREPARATION METHOD THEREFOR AND APPLICATION THEREOF

(71) Applicant: JINAN SHENGQUAN GROUP SHARE HOLDING CO., LTD., Shandong (CN)

(72) Inventors: Yilin Tang, Shandong (CN); Jinzhu Zhang, Shandong (CN); Ripeng Xu, Shandong (CN); Ding Liu, Shandong (CN)

(73) Assignee: JINAN SHENGQUAN GROUP SHARE HOLDING CO., LTD., Shandong (CN)

( * ) Notice: Subject to any disclaimer, the term of this patent is extended or adjusted under 35 U.S.C. 154(b) by 183 days.

(21) Appl. No.: 15/777,474

(22) PCT Filed: Nov. 7, 2016

(86) PCT No.: PCT/CN2016/104933
§ 371 (c)(1),
(2) Date: May 18, 2018

(87) PCT Pub. No.: WO2017/084507
PCT Pub. Date: May 26, 2017

(65) Prior Publication Data
US 2018/0327567 A1    Nov. 15, 2018

(30) Foreign Application Priority Data

Nov. 20, 2015 (CN) .......................... 201510819312.X
Nov. 27, 2015 (CN) .......................... 201510847955.5

(51) Int. Cl.
*C08K 3/04* (2006.01)
*C08K 3/08* (2006.01)
(Continued)

(52) U.S. Cl.
CPC ............ *C08K 3/042* (2017.05); *C01B 32/184* (2017.08); *C08K 3/08* (2013.01); *C08L 7/02* (2013.01);
(Continued)

(58) Field of Classification Search
CPC .... C08K 3/042; C08K 3/08; C08K 2003/023; C08K 2003/0812; C08K 2003/0856; C08K 2201/011; C01B 32/184; C08L 7/02
(Continued)

(56) References Cited

U.S. PATENT DOCUMENTS

2011/0014111 A1    1/2011  Leugers et al.
2011/0284805 A1*  11/2011  Samulski .............. B82Y 30/00
                                                        252/503
(Continued)

FOREIGN PATENT DOCUMENTS

CN    101618870 A    1/2010
CN    102306757 A    1/2012
(Continued)

OTHER PUBLICATIONS

Wypych, G., "2.146 Graphene," Handbook of Fillers, 4th Ed., ChemTec Publishing, pp. 127-128. (Year: 2016).*
(Continued)

*Primary Examiner* — Josephine L Chang
(74) *Attorney, Agent, or Firm* — Faegre Drinker Biddle & Reath LLP

(57) ABSTRACT

Graphene-containing latex. The latex contains a graphene structure and non-carbon, non-oxygen and non-hydrogen elements. The provided latex is enabled to have multiple performances such as far-infrared performance, antibacterial performance and bacteriostasis by selecting a specific carbon nanostructure compound and by means of collocation
(Continued)

and combination of a graphene structure and elements such as Fe, Si and Al; and furthermore, higher far-infrared effect and antibacterial effect can be achieved by controlling a specific addition proportion. The experimental results prove that the far-infrared performance of the latex can reach a maximum value of 0.93, and the bacteriostasis can reach a maximum value of 99%.

14 Claims, 1 Drawing Sheet

(51) Int. Cl.
*C08L 7/02* (2006.01)
*C01B 32/184* (2017.01)
*C08K 3/02* (2006.01)

(52) U.S. Cl.
CPC .................. *C08K 2003/023* (2013.01); *C08K 2003/0812* (2013.01); *C08K 2003/0856* (2013.01); *C08K 2201/011* (2013.01)

(58) Field of Classification Search
USPC .................................................. 524/440, 40
See application file for complete search history.

(56) References Cited

U.S. PATENT DOCUMENTS

| | | | |
|---|---|---|---|
| 2012/0000845 | A1 | 1/2012 | Park et al. |
| 2012/0244333 | A1 | 9/2012 | Aksay et al. |
| 2017/0107650 | A1 | 4/2017 | Chou et al. |
| 2017/0137293 | A1 | 5/2017 | Tang et al. |
| 2018/0037460 | A1* | 2/2018 | Fu .......................... C01B 32/184 |
| 2018/0273387 | A1 | 9/2018 | Tang et al. |
| 2018/0355517 | A1 | 12/2018 | Tang et al. |

FOREIGN PATENT DOCUMENTS

| | | | |
|---|---|---|---|
| CN | 102530928 | A | 7/2012 |
| CN | 102732037 | A | 10/2012 |
| CN | 103131018 | A | 6/2013 |
| CN | 103466613 | A | 12/2013 |
| CN | 103508444 | A | 1/2014 |
| CN | 103579596 | A | 2/2014 |
| CN | 103647043 | A | 3/2014 |
| CN | 102142558 | B | 4/2014 |
| CN | 103691446 | A | 4/2014 |
| CN | 103898782 | A | 7/2014 |
| CN | 104009235 | A | 8/2014 |
| CN | 104016341 | A | 9/2014 |
| CN | 104118873 | A | 10/2014 |
| CN | 104118874 | A | 10/2014 |
| CN | 104164707 | A | 11/2014 |
| CN | 104177766 | A | 12/2014 |
| CN | 104194252 | A | 12/2014 |
| CN | 104211058 | A | 12/2014 |
| CN | 104231539 | A | 12/2014 |
| CN | 104292745 | A | 1/2015 |
| CN | 104328523 | A | 2/2015 |
| CN | 104332613 | A | 2/2015 |
| CN | 104357941 | A | 2/2015 |
| CN | 103046151 | B | 4/2015 |
| CN | 104562276 | A | 4/2015 |
| CN | 104610557 | A | 5/2015 |
| CN | 104630928 | A | 5/2015 |
| CN | 104724699 | A | 6/2015 |
| CN | 104787750 | A | 7/2015 |
| CN | 104817746 | A | 8/2015 |
| CN | 104831389 | A | 8/2015 |
| CN | 104891479 | A | 9/2015 |
| CN | 105001601 | A | 10/2015 |
| CN | 105037835 | A | 11/2015 |
| CN | 105295090 | A * | 2/2016 |
| CN | 105502330 | A | 4/2016 |
| CN | 105504199 | A | 4/2016 |
| CN | 105504341 | A | 4/2016 |
| CN | 105506765 | A | 4/2016 |
| CN | 105525384 | A | 4/2016 |
| CN | 105586658 | A | 5/2016 |
| CN | 105603568 | A | 5/2016 |
| CN | 105623002 | A | 6/2016 |
| KR | 20120063857 | A | 6/2012 |
| KR | 20120082287 | A | 7/2012 |
| KR | 20120116328 | A | 10/2012 |
| RU | 2470699 | C1 | 12/2012 |
| WO | 2007113219 | A1 | 10/2007 |
| WO | 2010045887 | A1 | 4/2010 |
| WO | 2010107762 | A1 | 9/2010 |

OTHER PUBLICATIONS

CN 105295090 A, machine translation, Google Patents. (Year: 2016).*
Hong, J. et al. (2013). Origin of New Broad Raman D and G Peaks in Annealed Graphene. Scientific Reports, 3 (2700):1-5.
Genovese, M., Jiang, J., Lian, K., and Holm, N. (2015). High capacitive performance of exfoliated biochar nanosheets from biomass waste corn cob. Journal of Materials Chemistry A, pp. 2903-2913, DOI: 10.1039/c4a06110a.
Pint, J., Cruz, et al. (2012). Characterization of corn cob as a possible raw building material. Construction and Building Materials, 34:28-33.
International Preliminary Report on Patentability issued in PCT/CN2016/104933 [English translation included], dated May 31, 2018, 17 pages.
International Preliminary Report on Patentability issued in PCT/CN2016/105641 [English translation inclusive], dated May 31, 2018, 12 pages.
International Search Report and Written Opinion issued in PCT/CN2016/093115, dated Sep. 21, 2016, 6 pages.
International Search Report and Written Opinion issued in PCT/CN2016/099750 with Translation of ISR, dated Dec. 29, 2016, 16 pages.
International Search REport iossued in PCT/CN2016/106435, Feb. 17, 2017, 4 pages.
International Search Report issued in PCT/CN2016/104933, dated Jan. 24, 2017, 4 pages.
International Search Report issued in PCT/CN2016/105641, dated Feb. 17, 2017, 6 pages.
International Search Report issued in PCT/CN2016/106434, dated Feb. 23, 2017, 4 pages.
Written Opinion issued in PCT/CN2016/105641 [English translation inclusive], dated Feb. 17, 2017, 9 pages.
Written Opinion of the International Searching Authority issued PCT/CN2016/104933 [English translation included], dated Jan. 24, 2017, 15 pages.
Office Action issued in Russian Patent Application 2017129230/05, dated Dec. 24, 2018 (with English translation), 13 pages.
Communication pursuant to Article 94(3) EPC, issued in European Patent Application 16 865 799.7, dated Oct. 17, 2019, 61 pages.
Non-final Office Action issued in U.S. Appl. No. 15/777,636, dated Jul. 6, 2020, 23 pages.

* cited by examiner

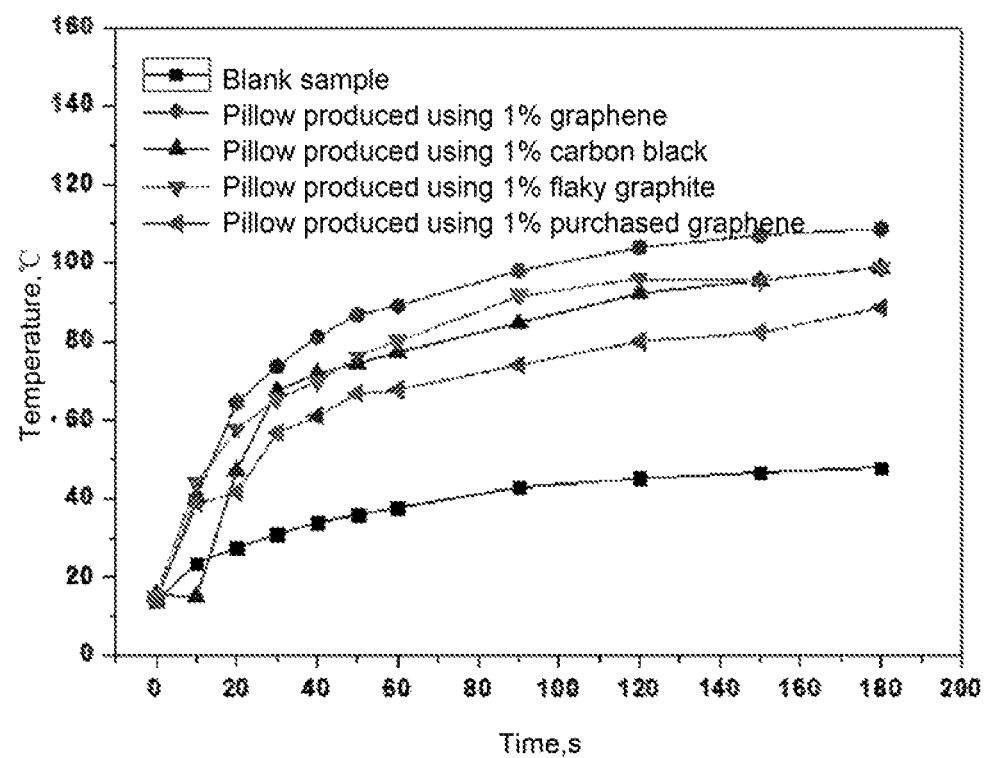

GRAPHENE-CONTAINING MODIFIED LATEX AS WELL AS PREPARATION METHOD THEREFOR AND APPLICATION THEREOF

CROSS-REFERENCE TO RELATED APPLICATIONS

This application is a national stage application of PCT Application No. PCT/CN2016/104933, filed Nov. 7, 2016, which claims priority to the following Chinese patent applications: Chinese Patent Application No. 201510847955.5, filed on Nov. 27, 2015; and Chinese Patent Application No. 201510819312.X, filed on Nov. 20, 2015; all of which are herein incorporated by reference in their entireties.

TECHNICAL FIELD

The present disclosure relates to a modified latex, especially to a graphene structure-containing modified latex and its preparation method and application.

BACKGROUND

Latex can be divided into 3 categories of natural, synthetic and artificial latexes.

Latex products are widely used in industrial and agricultural production, health care, military industry, culture and sports, and daily life due to their super high elasticity, strong tactility, good wearability, good orthopedic function, and good biological properties, and the like. The more common latex products include mainly latex gloves, latex condoms, latex balloons, latex hoses, latex fingerstalls, latex collodion silks, etc., and also some latex products with special functional applications. With the continuous improvement of people's living standards and the progressive progress of social civilization, the vigorous development of medical and health undertakings, the demand for latex products has also gradually increased. At the same time, with the development of science and technology, improvement of people's living quality and strengthening of personal health and safety awareness, the relevance of the quality and hygienic properties of latex products with personal health and safety has received increasing attentions, especially for latex products such as latex medical gloves, latex condoms that are in direct contact with human skin, the use safety of which has received more attentions. Therefore, the market puts forward higher and newer technical requirements for the inherent quality of latex products. In order to improve the inherent quality of latex products and better meet the needs of the market, foreign researchers, production and testing engineers and technicians have carried out a large amount of research and development work in terms of raw materials, production technologies, equipment improvement and detection technologies, etc., constantly improved the quality of latex products, developed many new products, and promoted the technical progress and development of the entire latex industry.

It has been indicated by the medical reports that pillows, bedclothes, and mattresses are the breeding grounds for bacteria and dust mites. For pillows which have been used for three years, 10% of mold, mite excretions, and numerous mite corpses will be contained. According to the medical information, 12%-16% of people have allergies, and 25% of these patients have allergies caused by dust mites in their homes; in addition, more than 90% of patients with asthma are caused by dust mites in their homes. From the above information, the damage degree of dust mites to humans can be seen.

Therefore, how to develop a latex and a latex product with multi-functionality has become the focus of attention and the problem to be solved in the art at present.

SUMMARY

In view of above, the technical problem to be solved by the present disclosure is to provide a graphene structure-containing modified latex and its preparation method and application. The modified latex and articles thereof provided by the present disclosure not only have a better far infrared property, but also can produce higher bacteria resistance and inhibition properties.

The present disclosure provides a graphene structure-containing modified latex comprising a graphene structure and non-carbon non-oxygen non-hydrogen elements;
the non-carbon non-oxygen non-hydrogen elements comprise elements of Fe, Si, and Al; and
the elements of Fe, Si, and Al in total accounts for 0.0018 wt % to 0.4 wt % of the modified latex.

Preferably, the substance containing a graphene structure and non-carbon non-oxygen non-hydrogen elements is introduced in a form of a carbon nanostructure-containing composite.

Preferably, the carbon nanostructure-containing composite contains graphene, amorphous carbon and non-carbon non-oxygen elements; in the carbon nanostructure-containing composite, the non-carbon non-oxygen elements include elements of Fe, Si and Al; the content of the non-carbon non-oxygen element is 0.5 wt % to 6 wt % of the carbon nanostructure-containing composite.

Preferably, the content of carbon element in the carbon nanostructure-containing composite is greater than or equal to 80 wt %.

Preferably, the non-carbon non-oxygen elements accounts for 0.3 wt % to 5 wt %, preferably 1.5 wt % to 5 wt % of the carbon nanostructure-containing composite.

Preferably, the non-carbon non-oxygen elements are adsorbed on the surface or inside of the carbon nanostructure in a form of any one or more of elementary substance, oxide, or carbide.

As one alternative embodiment, the method for preparing the carbon nanostructure-containing composite includes the following steps:

(1) under the action of a catalyst, catalytically treating a biomass carbon source to obtain a precursor;

(2) under a condition of protective gas, maintaining the precursor at 140° C. to 180° C. for 1.5 to 2.5 hours to obtain a first intermediate;

(3) under a condition of protective gas, heating the first intermediate to 350° C. to 450° C. and maintaining at that temperature for 3 to 4 hours to obtain a second intermediate;

(4) under a condition of protective gas, heating the second intermediate to 1100° C. to 1300° C. and maintaining at that temperature for 2 to 4 hours to obtain a third intermediate;

(5) subjecting the third intermediate to alkali washing, acid washing and water washing successively to obtain a composite; the heating rate in step (3) and (4) is 14° C./min to 18° C./min.

As a second alternative embodiment, the method for preparing the carbon nanostructure-containing composite includes the following steps:

(1) mixing a biomass carbon source and a catalyst, stirring and catalyzing, then drying to obtain a precursor;

(2) under a protective atmosphere, maintaining the precursor at 280° C. to 350° C. for 1.5 to 2.5 hours, then heating by temperature programming to 950° C. to 1200° C. at a heating rate of 15 to 20° C./min, maintaining that temperature for 3 to 4 hours to obtain a crude product;

(3) washing the crude product to obtain a carbon nanostructure-containing composite.

In the second alternative embodiment, the mass ratio of biomass carbon source to catalyst is 1:0.1-10, preferably 1:0.5-5, further preferably 1:1-3; preferably, the catalyst is any one or a combination of at least two selected from the group consisting of manganese compounds, iron-containing compounds, cobalt-containing compounds, and nickel-containing compounds; preferably, the iron-containing compound is any one or a combination of at least two selected from the group consisting of halogen compounds of iron, iron cyanides and iron-containing salts of acid; preferably, the cobalt-containing compound is any one or a combination of at least two selected from the group consisting of halogen compounds of cobalt and cobalt-containing salts of acid; preferably, the nickel-containing compound is any one or a combination of at least two selected from the group consisting of nickel chlorides and nickel-containing salts of acid; preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

The stirring and catalyzing treatment is carried out at a temperature of 150 to 200° C. for a time of ≤4 hours, preferably 4 to 14 hours; preferably, the water content in the precursor is 10 wt % or lower; preferably, the heating rate for heating the precursor to 280 to 350° C. is 3 to 5° C./min; preferably, the protective atmosphere is any one or a combination of at least two selected from the group consisting of nitrogen gas, helium gas and argon gas, preferably nitrogen gas; preferably, the washing for crude product is successive acid washing and water washing; and the acid washing is preferably carried out by using hydrochloric acid with a concentration of 3 wt % to 6 wt %, further preferably hydrochloric acid with a concentration of 5 wt %; the water washing is preferably carried out by using deionized water and/or distilled water; preferably, the washing is carried out at a temperature of 55 to 65° C., preferably 60° C.

The biomass carbon source is cellulose and/or lignin, preferably cellulose, further preferably porous cellulose.

Preferably, the porous cellulose is obtained by the following method:
acid hydrolyzing a biomass source to obtain lignocellulose, then carrying out porous post-processing to obtain porous cellulose; optionally, the porous cellulose is used after bleaching;

Preferably, the biomass source is any one or a combination of at least two selected from the group consisting of plants and/or agricultural and forestry wastes; preferably any one or a combination of at least two selected from agricultural and forestry wastes; preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, and reeds, preferably corn cobs.

As a third alternative embodiment, the method for preparing the carbon nanostructure-containing composite includes the following steps:

(1') acid hydrolyzing the corn cobs to obtain lignocellulose, then carrying out porous post-processing to obtain porous cellulose, and bleaching the porous cellulose for ready use;

(1) mixing the porous cellulose of step (1') and catalyst in a mass ratio of 1:0.5-1.5, stirring and catalyzing at 150 to 200° C. for 4 hours or more, then drying until the water content of the precursor is less than 10 wt % to obtain a precursor;

(2) under a protective atmosphere, heating the precursor to 280 to 350° C. at a heating rate of 3 to 5° C./min and maintaining that temperature for 2 hours, then heating by temperature programming to 950 to 1050° C. at a heating rate of 15 to 20° C./min and maintaining that temperature for 3 to 4 hours to obtain a crude product;

(3) at a temperature of 55 to 65° C. subjecting the crude product to acid washing with hydrochloric acid having a concentration of 5 wt %, then water washing to obtain a carbon nanostructure-containing composite.

The carbon nanostructure-containing composites prepared by the above methods also belong to the case containing biomass graphene.

For the carbon nanostructure-containing composite, a typical but non-limiting example may be any one or a combination of at least two of substance 1, substance 2, substance 3 or substance 4 having properties described in Table A:

TABLE A

| Items | Performance indicators | | | |
| --- | --- | --- | --- | --- |
| | Substance 1 | Substance 2 | Substance 3 | Substance 4 |
| Conductivity, S/m | 2800-8000 | 5000-8000 | 2800-4000 | 3000-8000 |
| Specific surface area, $m^2/g$ | ≤150 | ≤150 | ≤300 | ≤250 |
| Raman spectrum, IG/ID | ≤2.0 | ≤3.0 | ≤2.0 | ≤2.0 |
| C/O | ≤35.0 | ≤40.0 | ≤35.0 | ≤40.0 |
| Ash, % | 1.0-4.0 | 2.0-4.0 | 1.0-2.5 | 1.0-2.0 |
| Fe, % | 0.1-0.5 | 0.1-0.5 | 0.1-0.5 | 0.1-0.5 |
| Si, % | 0.05-0.3 | 0.05-0.3 | 0.05-0.3 | 0.05-0.3 |
| Al, % | 0.05-0.4 | 0.05-0.4 | 0.05-0.4 | 0.05-0.4 |

In Table A, IG/ID is the peak height ratio of G peak to D peak in the Raman spectrum.

The carbon nanostructure-containing composite of the present disclosure has a peak height ratio of the G peak to D peak of preferably ≤2.0, further preferably ≤3.0, and particularly preferably ≤5.0. Optionally, the carbon nanostructure-containing composite of the present disclosure has a peak height ratio of the G peak to D peak of ≥30, for example, 27, 25, 20, 18, 15, 12, 10, 8, and 7, etc.

Those skilled in the art should understand that the performance indicators of the carbon nanostructure-containing composite listed in Table A all refer to the indicators of the powder of the carbon nanostructure-containing composite. If the carbon nanostructure-containing composite is a slurry, the above indicators are the indicators of the powder before preparing the slurry.

When the carbon nanostructure-containing composite is powder, the carbon nanostructure-containing composite powder has the following properties in addition to the performance indicators described in Table A:

black powder, uniform fineness, without obvious large particles, water content≥3.0%, particle size D90≥10.0 μm, pH 5.0 to 8.0, and apparent density of 0.2 to 0.4 g/cm³.

When the carbon nanostructure-containing composite is a slurry, it is a product obtained by dispersing carbon nanostructure-containing composite in a solvent, and the carbon nanostructure-containing composite slurry has the following properties in addition to the performance indicators described in Table A:

solid content of 1.0-10.0%, particle size D50≥0.7 um, pH 8.0 to 10.0, Zeta potential≥−10 mV, and viscosity of 5.0 to 8.0 mpa·s.

Preferably, the mass of the carbon nanostructure-containing composite is 0.1 wt % to 10 wt % of the mass of modified latex.

Preferably, the graphene structure has a thickness of less than or equal to 100 nm.

Preferably, the graphene structure is one or a combination of more of carbon six-membered ring honeycomb lamellar structures having 1-10 layers.

Preferably, the non-carbon non-oxygen non-hydrogen elements further comprise one or more of P, Ca, Na, Ni, Mn, K, Mg, Cr, S and Co. Preferably, the total content of these elements is less than 0.5 wt % of the latex.

Preferably, the total content of non-carbon non-oxygen non-hydrogen elements other than elements of Fe, Si, and Al is less than 0.5 wt % of the latex.

Preferably, the elements of Fe, Si, and Al in total account for 0.01 wt % to 0.4 wt % of the latex.

Preferably, the substance containing a graphene structure and non-carbon non-oxygen non-hydrogen elements is introduced in a form of a carbon nanostructure-containing composite.

Preferably, the graphene structure is introduced in a form of a biomass graphene.

Preferably, the biomass graphene is prepared by using biomass as a raw material.

The biomass is one or more of lignin, cellulose and a mixture thereof prepared from trees, straws and agricultural and forestry wastes.

A latex product is prepared with the modified latex of the present disclosure, which includes pillows, mattresses, cushions, back cushions, sofas, waist supports, insoles, brassieres, car seats, toilet seat cushions, condoms, gloves, balloons, nipples, feeding bottles or hand warmers.

Compared with the existing technology, the graphene structure-containing modified latex provided by the present disclosure is prepared by introducing a substance containing a graphene structure and non-carbon non-oxygen non-hydrogen elements (e.g., carbon nanostructure-containing composite) in the traditional latex, and by means of collocation and combination of graphene structure and elements of Fe, Si and Al, the modified latex provided by the present disclosure is enabled to have multiple properties such as far infrared property, bacteria resistance and inhibition properties; and by controlling a specific adding proportion, the modified latex provided by the present disclosure can have a higher far infrared effect and bacteria inhibition effect. Experimental results show that the far infrared property of the modified latex provided by the present disclosure can reach a maximum of 0.93; and the bacteria inhibition property can reach a maximum of 99%.

BRIEF DESCRIPTION OF DRAWINGS

FIG. 1 shows the temperature-time curves of different types of graphene pillows according to Example 1 and Comparative Examples 4-6.

DESCRIPTION

In order to further understand the present disclosure, preferred embodiments are described below in combination with the following examples. It should be understood that these descriptions are merely used for further illustrating the features and advantages of the present disclosure instead of limiting the claims of the present disclosure.

There is no particular restriction to the sources of all the raw materials in the present disclosure, as long as they are commercially available or prepared according to conventional methods well known by those skilled in the art.

There is no particular restriction to the purities of all the raw materials in the present disclosure, and analytical purity is preferably used in the present disclosure.

The present disclosure provides a graphene structure-containing modified latex comprising a graphene structure and non-carbon non-oxygen non-hydrogen elements; the non-carbon non-oxygen non-hydrogen elements comprise elements of Fe, Si, and Al; and the elements of Fe, Si, and Al in total account for 0.0018 wt % to 0.4 wt % of the modified latex. The elements of Fe, Si and Al described in the present disclosure in total preferably account for 0.01 wt % to 0.4 wt %, more preferably 0.02 wt % to 0.4 wt %, and most preferably 0.1 wt % to 0.3 wt % of the modified latex, and can be 0.05 wt %, 0.1 wt %, 0.12 wt %, 0.13 wt %, 0.2 wt %, 0.23 wt %, 0.28 wt %, and 0.38 wt %, etc. The mass fraction of the elements of Fe, Si and Al in total in the modified latex mentioned above in the present disclosure refers to the content of the elements of Fe, Si and Al in the modified latex, i.e., the content of the elements in the mixture.

There is no particular restriction to the graphene structure in the present disclosure, as long as it has a definition well-known by a person skilled in the art. The graphene structure in the present disclosure refers to a combination of multiple structures including a single-layer graphene structure or a multi-layer graphene structure, more preferably a combination of a single-layer graphene and a graphene with different layers; the graphene structure of the present disclosure is more preferably any one or a combination of more of carbon six-membered ring honeycomb lamellar structures having 1-10 layers, and more preferably any one or a combination of more of single layer structure, double layers structure or 3-10 layers structures. Generally, carbon six-membered ring honeycomb lamellar structures having more than 10 layers and a thickness of 100 nm or less are called graphene nanosheets; carbon six-membered ring honeycomb lamellar structures having more than 10 layers and a thickness of 100 nm or less and prepared by using biomass as carbon source are called biomass graphene nanosheets; carbon six-membered ring honeycomb lamellar structures having 1-10 layers are called graphene; and carbon six-membered ring honeycomb lamellar structures having 1-10 layers and prepared by using biomass as carbon source are called biomass graphene.

The graphene structure of the present disclosure preferably has the following microscopic appearance: the carbon six-membered ring honeycomb lamellar structure shows any one or a combination of more of conformations selected from the group consisting of warping, curling and folding on a microscopic level. The micromorphology of the lamellar structure in the composite typically can be observed via electron microscope which may be transmission electron microscope or scanning electron microscope. The graphene structure of the present disclosure preferably has a thickness of less than or equal to 100 nm, more preferably less than or equal to 50 nm, and most preferably less than or equal to 20 nm.

In the modified latex of the present disclosure, the non-carbon non-oxygen non-hydrogen elements preferably further comprise one or more selected from the group consisting of P, Ca, Na, Ni, Mn, K, Mg, Cr, S and Co, more preferably more selected therefrom. The non-carbon non-oxygen non-hydrogen elements exist in a form of any one or a combination of more of elementary substances and compounds. In the above preferred embodiments, the content of the above-mentioned elements in the modified latex is preferably less than 0.5 wt %, more preferably less than 0.4 wt %, more preferably less than 0.3 wt %, most preferably less than 0.2 wt %.

By way of example, the non-carbon non-oxygen non-hydrogen elements in the modified latex of the present disclosure comprise a combination of P, Ca and Na; a combination of Ni, Mn, K and Co; a combination of Mg, Cr, S and Mn; a combination of P, Ca, Na, Ni, Mn, K and Cr; a combination of P, Ca, Na, Ni, Mn, K, Mg, Cr, S and Co, etc. The content of the non-carbon non-oxygen non-hydrogen elements in the modified latex may be, for example, 0.21 wt %, 0.24 wt %, 0.27 wt %, 0.29 wt %, 0.33 wt %, 0.36 wt %, 0.38 wt %, 0.45 wt %, and 0.48 wt %, etc.

There is no particular restriction to how the graphene structure and the substance containing non-carbon non-oxygen non-hydrogen elements are introduced into the modified latex in the present disclosure, as long as they are introduced by a method well known by those skilled in the art. According to the present invention, in order to improve the performance of the latex, it is preferable that the graphene structure and the substance containing non-carbon non-oxygen non-hydrogen elements are introduced in the form of a carbon nanostructure-containing composite. The substance containing non-carbon non-oxygen non-hydrogen elements of the present disclosure is preferably a nanoscale material of the above elements, more preferably one or more selected from the group consisting of nanoscale elementary substances, nanoscale oxides and nanoscale inorganic compounds.

The mass of the carbon nanostructure-containing composite of the present disclosure accounts for preferably 0.1 wt % to 10 wt %, more preferably 1 wt % to 8 wt %, most preferably 3 wt % to 5 wt % of that of the modified latex. In the carbon nanostructure-containing composite, the content of carbon is preferably great than or equal to 80 wt %, more preferably 85 wt % to 97 wt %, most preferably 90 wt % to 95 wt %. In the carbon nanostructure-containing composite, the content of non-carbon non-oxygen non-hydrogen elements is preferably 0.3 wt % to 5 wt %, more preferably 0.3 wt % to 4 wt %, most preferably 1 wt % to 3 wt %. The carbon nanostructure-containing composite has a peak height ratio of G peak to D peak of 1 to 20, more preferably 3 to 20 in the Raman spectrum.

In the carbon nanostructure-containing composite of the present disclosure, the graphene structure preferably has a carbon six-membered ring honeycomb lamellar structure having a thickness of 100 nm or less, preferably a carbon six-membered ring honeycomb lamellar structure having a thickness of 20 nm or less, further preferably any one or a combination of at least two of carbon six-membered ring honeycomb lamellar structures having 1-10 layers, preferably any one or a combination of at least two of single layer structure, double layers structure or 3-10 layers structures; preferably, the carbon six-membered ring honeycomb lamellar structure in the composite shows any one or a combination of at least two of conformations selected from the group consisting of warping, curling and folding on a microscopic level.

The carbon nanostructure-containing composite of the present disclosure preferably comprises a graphene structure and amorphous carbon; the non-carbon non-oxygen non-hydrogen elements are adsorbed on the surface or inside of carbon nanostructure in a form of any one or a combination of more of elementary substance, oxide, and carbide. The amorphous carbon also comprises two-dimensional graphite layers or three-dimensional graphite crystallites, on the edge of which there are a large number of irregular bonds, and further comprises many sp3 carbons besides a large number of sp2 carbons. In fact, their (amorphous carbon) interior structures are crystals having the same structure as graphite, rather than real amorphous body, besides that the layered structure formed by hexagonal annular plane of carbon atoms is messy and irregular and there are defects in the formed crystal; the majority of amorphous carbon is formed by molecular debris having graphite layer structure which are roughly parallel to each other, and irregularly stacked together, referred to as chaotic layer structure. The layers or debris is connected by carbon atom bonds in the form of tetrahedral bonding of diamond structure.

Preferably, during the process of preparing the modified latex, the substance for introducing graphene structure is not activated or modified during the introduction of graphene structure.

There is no particular restriction to the method for preparing the carbon nanostructure-containing composite in the present disclosure.

Preferably, the carbon nanostructure-containing composite contains graphene, amorphous carbon and non-carbon non-oxygen elements; in the carbon nanostructure-containing composite, the non-carbon non-oxygen elements include elements of Fe, Si and Al; the content of the non-carbon non-oxygen element is 0.5 wt % to 6 wt % of the carbon nanostructure-containing composite.

The content of carbon in the carbon nanostructure-containing composite is preferably greater than or equal to 80 wt %, for example 82 wt %, 86 wt %, 89 wt %, 91 wt %, 94 wt %, 97 wt %, 99 wt %, etc., preferably 85 wt % to 97 wt %, more preferably 90 wt % to 95 wt %.

Preferably, the non-carbon non-oxygen element accounts for 0.3 wt % to 5 wt %, preferably 0.5 wt % to 5 wt %, more preferably 1.5 wt % to 5 wt % of the carbon nanostructure-containing composite. In certain embodiments of the present disclosure, the non-carbon non-oxygen element accounts for 0.7 wt %, 1.1 wt %, 1.3 wt %, 1.6 wt %, 2 wt %, 2.8 wt %, 3.5 wt %, 4.2 wt %, 5.3 wt % or 5.8 wt % of the carbon nanostructure-containing composite.

Preferably, the non-carbon non-oxygen elements are adsorbed on the surface or inside of the carbon nanostructure in a form of any one or more of elementary substance, oxide, or carbide.

As one alternative embodiment, a Method 1 for preparing the carbon nanostructure-containing composite includes the following steps:

(1) under the action of a catalyst, catalytically treating a biomass carbon source to obtain a precursor;

(2) under a condition of protective gas, maintaining the precursor at 140° C. to 180° C. for 1.5 to 2.5 hours to obtain a first intermediate;

(3) under a condition of protective gas, heating the first intermediate to 350° C. to 450° C. and maintaining at that temperature for 3 to 4 hours to obtain a second intermediate;

(4) under a condition of protective gas, heating the second intermediate to 1100° C. to 1300° C. and maintaining at that temperature for 2 to 4 hours to obtain a third intermediate;

(5) subjecting the third intermediate to alkali washing, acid washing and water washing successively to obtain a composite; the heating rate in step (3) and (4) is 14° C./min to 18° C./min.

The carbon source is preferably biomass carbon source, and the biomass carbon source is any one or a combination of at least two selected from the group consisting of plants and/or agricultural and forestry wastes; preferably any one or a combination of at least two of needlebush, broadleaf wood, forestry wood, and agricultural and forestry wastes; preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, fruit shell, and reeds, preferably corn cobs. The biomass carbon source is preferably lignocellulose, cellulose and/or lignin, more preferably cellulose and/or lignin, more preferably cellulose, and further preferably porous cellulose.

The mass ratio of biomass carbon source to catalyst is 1:0.1 to 10, for example 1:0.2, 1:0.5, 1:0.8, 1:1.1, 1:1.5, 1:2, 1:3, 1:4, 1:5, 1:6, 1:7, 1:8, and 1:9, etc., preferably 1:0.5-5, more preferably 1:1-3.

Preferably, the catalyst is any one or a combination of at least two selected from the group consisting of manganese compounds, iron-containing compounds, cobalt-containing compounds, and nickel-containing compounds; the iron-containing compound is any one or a combination of at least two selected from the group consisting of halogen compounds of iron, iron cyanides and iron-containing salts of acid; the cobalt-containing compound is any one or a combination of at least two selected from the group consisting of halogen compounds of cobalt and cobalt-containing salts of acid; the nickel-containing compound is any one or a combination of at least two selected from the group consisting of nickel chlorides and nickel-containing salts of acid; further preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate. By way of example, the catalyst is selected from the group consisting of a combination of ferric chloride and ferric nitrate; a combination of ferrous nitrate, ferric sulfate and cobalt chloride; a combination of cobalt acetate, nickel chloride and nickel sulfate; a combination of potassium ferricyanide, potassium ferrocyanide, potassium trioxalatoferrate and ferrous nitrate; and a combination of cobalt chloride, cobalt nitrate, cobalt sulfate and cobalt acetate, etc.

Preferably, the stirring and catalyzing treatment in step (1) is carried out at a temperature of 150 to 200° C. for ≤4 hours, preferably 4 to 14 hours; the water content in the precursor is preferably 10 wt % or lower; the heating rate for heating the precursor to 280 to 350° C. is 3 to 5° C./min in step (2);

the protective atmosphere is any one or a combination of at least two selected from the group consisting of nitrogen gas, helium gas and argon gas, preferably nitrogen gas; the washing for crude product is successive acid washing and water washing in step (3); and the acid washing is preferably carried out by using hydrochloric acid with a concentration of 3 wt % to 6 wt %, further preferably hydrochloric acid with a concentration of 5 wt %; the water washing is preferably carried out by using deionized water and/or distilled water; the washing is carried out at a temperature of 55 to 65° C., preferably 60° C.

Preferably, the above preparation steps of the present disclosure can also specifically be:

firstly, mixing a biomass carbon source and a catalyst, stirring and catalyzing, then drying to obtain a precursor;

then maintaining the precursor at a temperature of 140 to 180° C. for 1.5 to 2.5 hours under a protective atmosphere to obtain a first intermediate; in certain specific embodiments of the present disclosure, the temperature is 142° C., 148° C., 155° C., 1600° C., 172° C. or 178° C.; and the time for maintaining the temperature is 1.6 hours, 1.8 hours, 2 hours, 2.2 hours or 2.4 hours;

then heating by temperature programming to 350 to 450° C. and maintaining the temperature for 3 to 4 hours to obtain a second intermediate; in certain specific embodiments of the present disclosure, the temperature is 360° C., 370° C., 380° C., 390° C., 410° C., 420° C., 430° C. or 440° C.; and the time for maintaining the temperature is 3.1 hours, 3.3 hours, 3.5 hours, 3.8 hours or 3.9 hours;

then heating to 1100 to 1300° C. and maintaining the temperature for 2 to 4 hours to obtain a third intermediate, i.e. a crude product; in certain specific embodiments of the present disclosure, the temperature is 1130° C., 1170° C., 1210° C. or 1280° C.; and the time for maintaining the temperature is 2.2 hours, 2.4 hours, 2.6 hours, 2.8 hours, 3.0 hours, 3.2 hours, 3.4 hours, 3.6 hours or 3.8 hours;

the heating rate of the temperature programming is 14° C./min to 18° C./min; in certain specific embodiments of the present disclosure, the heating rate is 15° C./min, 16° C./min or 17° C./min;

finally, alkali washing, acid washing and water washing the third intermediate (i.e. the crude product) to obtain a composite.

In the present disclosure, the biomass carbon source is preferably one or more selected from lignocellulose, cellulose and lignin, more preferably lignocellulose, cellulose or lignin.

In the present disclosure, the mass ratio of biomass carbon source to catalyst is 1:(0.5-5), preferably 1:(1-3); in certain specific embodiments of the present disclosure, the ratio is 1:0.5, 1:1 or 1:3.

In the present disclosure, the catalyst is any one or a combination of at least two selected from the group consisting of halogen compounds of manganese, iron-containing compounds, cobalt-containing compounds, and nickel-containing compounds.

Preferably, the iron-containing compound is any one or a combination of at least two selected from the group consisting of halogen compounds of iron, iron cyanides and iron-containing salts of acid. The iron-containing salts of acid are organic acid salts containing iron element or inorganic acid salts containing iron element. The halogen compounds of iron may be ferric chloride and/or ferric bromide.

Preferably, the cobalt-containing compound is any one or a combination of at least two selected from the group consisting of halogen compounds of cobalt and cobalt-containing salts of acid. The cobalt-containing salts of acid are organic acid salts containing cobalt element or inorganic acid salts containing cobalt element. The halogen compounds of cobalt may be cobalt chloride and/or cobalt bromide.

Preferably, the nickel-containing compound is any one or a combination of at least two selected from the group consisting of nickel chlorides and nickel-containing salts of acid. The nickel-containing salts of acid are organic acid salts containing nickel element or inorganic acid salts containing nickel element. The halogen compounds of nickel may be nickel chloride and/or nickel bromide.

Preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

Typical but non-limiting examples of the combination of the catalyst of the present disclosure include a combination of ferrous chloride and ferric sulfate; a combination of potassium ferricyanide and potassium trioxalatoferrate; a combination of cobalt chloride, cobalt nitrate and ferric chloride; a combination of cobalt sulfate, cobalt acetate and nickel nitrate; and a combination of ferric chloride, cobalt chloride, and nickel acetate.

The stirring and catalyzing treatment is carried out at a temperature of 150° C. to 200° C., for example, 160° C., 170° C., 180° C., and 190° C., etc., and the time is ≤4 hours, preferably 4 hours to 14 hours. In certain specific embodiments of the present disclosure, the time is 4.2 hours, 7 hours, 9 hours, 12 hours, 16 hours, 19 hours, and 23 hours.

Preferably, the water content in the precursor is 10 wt % or less. In certain specific embodiments of the present disclosure, the water content is 1 wt %, 2 wt %, 3 wt %, 4 wt %, 5 wt %, 6 wt %, 7 wt %, 8 wt %, and 10 wt %, etc.

Preferably, the protective atmosphere is any one or a combination of at least two selected from the group consisting of nitrogen gas, helium gas and argon gas, preferably nitrogen gas.

Preferably, the acid washing is carried out by using an aqueous hydrochloric acid solution with a concentration of 3 wt % to 6 wt %, further preferably an aqueous hydrochloric acid solution with a concentration of 5 wt %; the water washing is preferably carried out by using deionized water and/or distilled water; the alkali washing is carried out by using an aqueous sodium hydroxide solution with a concentration of 5 wt % to 15 wt %, further preferably an aqueous sodium hydroxide solution with a concentration of 10 wt %.

Preferably, the washing is carried out at a temperature of 55 to 65° C., for example 56° C., 57° C., 58° C., 60° C., and 63° C., etc., preferably 60° C.

The biomass carbon source is cellulose and/or lignin, preferably cellulose, further preferably porous cellulose.

The porous cellulose of the present disclosure can be obtained according to the existing technology. Typical but non-limiting existing technology for obtaining porous cellulose includes, for example, the method for preparing porous cellulose disclosed in CN104016341A, and the method for preparing cellulose disclosed in CN103898782A.

Preferably, the porous cellulose is obtained by the following method:
acid hydrolyzing a biomass source to obtain lignocellulose, then carrying out porous post-processing to obtain porous cellulose; optionally, the porous cellulose is used after bleaching.

The biomass source is any one or a combination of at least two selected from the group consisting of plants and/or agricultural and forestry wastes; preferably, any one or a combination of at least two selected from the group consisting of agricultural and forestry wastes.

Preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, and reeds, preferably corn cobs.

Typical but non-limiting combinations of the biomass source of the present disclosure include a combination of corn stalks and corn cobs; a combination of bagasse, sorghum stalks and wood chips; a combination of beet residues, bagasse and corn cobs; and a combination of sorghum stalks, beet residues and xylose residues, etc.

As a second alternative embodiment, a Method 2 for preparing the carbon nanostructure-containing composite includes the following steps:
(1) mixing a biomass carbon source and a catalyst, stirring and catalyzing, then drying to obtain a precursor;
(2) under a protective atmosphere, maintaining the precursor at a temperature of 280 to 350° C. for 1.5 to 2.5 hours, then heating by temperature programming to 950 to 1200° C. at a heating rate of 15 to 20° C./min, maintaining that temperature for 3 to 4 hours to obtain a crude product;
(3) washing the crude product to obtain a carbon nanostructure-containing composite.

In the second alternative embodiment, the mass ratio of biomass carbon source to the catalyst is 1:0.1-10, preferably 1:0.5-5, further preferably 1:1-3; preferably, the catalyst is any one or a combination of at least two selected from the group consisting of manganese compounds, iron-containing compounds, cobalt-containing compounds, and nickel-containing compounds; preferably, the iron-containing compound is any one or a combination of at least two selected from the group consisting of halogen compounds of iron, iron cyanides and iron-containing salts of acid; preferably, the cobalt-containing compound is any one or a combination of at least two selected from the group consisting of halogen compounds of cobalt and cobalt-containing salts of acid; preferably, the nickel-containing compound is any one or a combination of at least two selected from the group consisting of nickel chlorides and nickel-containing salts of acid; preferably, the catalyst is any one or a combination of at least two selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate.

The stirring and catalyzing treatment is carried out at a temperature of 150 to 200° C. for ≤4 hours, preferably 4 to 14 hours; preferably, the water content in the precursor is 10 wt % or lower; preferably, the heating rate for heating the precursor to 280 to 350° C. is 3 to 5° C./min; preferably, the protective atmosphere is any one or a combination of at least two selected from the group consisting of nitrogen gas, helium gas and argon gas, preferably nitrogen gas; preferably, the washing for crude product is successive acid washing and water washing; and the acid washing is preferably carried out by using hydrochloric acid with a concentration of 3 wt % to 6 wt %, further preferably hydrochloric acid with a concentration of 5 wt %; the water washing is preferably carried out by using deionized water and/or distilled water; preferably, the washing is carried out at a temperature of 55 to 65° C., preferably 60° C.

The biomass carbon source is cellulose and/or lignin, preferably cellulose, further preferably porous cellulose.

Preferably, the porous cellulose is obtained by the following method:
acid hydrolyzing a biomass source to obtain lignocellulose, then carrying out porous post-processing to obtain porous cellulose; optionally, the porous cellulose is used after bleaching.

Preferably, the biomass carbon source is any one or a combination of at least two selected from the group consisting of plants and/or agricultural and forestry wastes; preferably, any one or a combination of at least two selected from agricultural and forestry wastes; preferably, the agricultural and forestry wastes are any one or a combination of at least two selected from the group consisting of corn stalks, corn cobs, sorghum stalks, beet residues, bagasse, furfural residues, xylose residues, wood chips, cotton stalks, and reeds, preferably corn cobs.

As the third alternative embodiment, a Method 3 for preparing the carbon nanostructure-containing composite includes the following steps:

(1') acid hydrolyzing the corn cobs to obtain lignocellulose, then carrying out porous post-processing to obtain porous cellulose, bleaching the porous cellulose for ready use;

(1) mixing the porous cellulose of step (1') and catalyst in a mass ratio of 1:0.5-1.5, stirring at 150 to 200° C. to catalyze for 4 hours or more, then drying until the water content of the precursor is less than 10 wt % to obtain a precursor;

(2) under a protective atmosphere, heating the precursor to 280 to 350° C. at a heating rate of 3 to 5° C./min and maintaining that temperature for 2 hours, then heating by temperature programming to 950 to 1050° C. at a heating rate of 15 to 20° C./min and maintaining that temperature for 3 to 4 hours to obtain a crude product;

(3) at a temperature of 55 to 65° C., subjecting the crude product to acid washing with hydrochloric acid having a concentration of 5 wt %, then water washing to obtain a carbon nanostructure-containing composite.

The carbon nanostructure-containing composites prepared by the above methods (Method 1, 2 and 3) also belong to the case containing biomass graphene.

The carbon nanostructure-containing composites prepared by the above preparation methods also belong to the case containing biomass graphene.

The carbon nanostructure-containing composite of the present disclosure can also be prepared by the following various methods.

Method 4: Biomass source is used to obtain active carbon via current processes. Since the types and contents of microelements within different plants are greatly different, later steps such as acid washing and water washing are used to control the content of non-carbon non-oxygen non-hydrogen elements. Graphene is introduced on such a basis to make non-carbon non-oxygen non-hydrogen elements account for 0.3 wt % to 5 wt % of the composite.

Method 5: Commercially available lignin is carbonized at high-temperature under inert gas, or subjected to incomplete graphitization reaction. Then graphene is added. A combination of any three (including at least Fe, Si and Al) or more elements selected from the group consisting of nano-P, Si, Ca, Al, Na, Fe, Ni, Mn, K, Mg, Cr, S or Co is introduced at a later stage, and the content thereof is controlled to be 0.3 wt % to 5 wt %.

Method 6: Some organic wastes such as phenolic resin cystosepiment are carbonized, then graphene is introduced. A combination of any three (including at least Fe, Si and Al) or more elements selected from the group consisting of nano-P, Si, Ca, Al, Na, Fe, Ni, Mn, K, Mg, Cr, S or Co is introduced at a later stage, and the content thereof is controlled to be 0.3 wt % to 5 wt %.

Method 7: Active carbon and graphene are added into nano-graphite. A combination of any three (including at least Fe, Si and Al) or more elements selected from the group consisting of nano-P, Si, Ca, Al, Na, Fe, Ni, Mn, K, Mg, Cr, S or Co is introduced at a later stage, and the content thereof is controlled to be 0.3 wt % to 5 wt %.

The preparation of carbon nanostructure-containing composite to be introduced in the present disclosure is not limited to these methods described above. After the introduction of the carbon nanostructure-containing composite prepared by the above methods into the latex, the far infrared property and bacteria resistance of the modified latex obtained by Methods 1 to 3 are superior to those obtained by Methods 4 to 7. However, homogeneous dispersion of the carbon nanostructure-containing composite in the latex and a certain effect can be achieved without activating or modifying the carbon nanostructure-containing composite when preparing modified latex, especially for Methods 1 to 3.

The graphene structure and a substance containing elements of Fe, Si and Al are introduced in the form of a carbon nanostructure-containing composite in the present disclosure, and in the process of introduction, effective combination with latex and additionally enhanced far infrared effect and bacteria inhibition effect can be achieved without the necessary of carrying out the pretreatment of the substance such as activation, and modification, etc. A first method for determining the content of non-carbon non-oxygen non-hydrogen element is:
decomposing the carbon nanostructure-containing composite with nitric acid ($\rho=1.42$ g/mL), perchloric acid ($\rho=1.67$ g/mL) and hydrofluoric acid ($\rho=1.16$ g/mL), maintaining the temperature in nitric acid medium, determining the volume, then quantitatively analyzing the content of elements of P, Si, Ca, Al, and Na, etc., in the carbon nanostructure-containing composite with inductively coupled plasma atomic emission spectrometer using standard curve method.

A second method for determining the content of non-carbon non-oxygen non-hydrogen element is:
Using the National Standard GB/T17359-1998: General specification of X-ray energy spectra quantitative analysis for electronic probe and scanning electron microscope.

There is no restriction to the method for determining non-carbon non-oxygen non-hydrogen element in the present disclosure, and any of the methods known in the art or new determining method can be used in the present disclosure. The present disclosure provides two methods for determining the content of non-carbon non-oxygen non-hydrogen element, preferably "First method for determining the content of non-carbon non-oxygen non-hydrogen element" is used. "First method for determining the content of non-carbon non-oxygen non-hydrogen element" is used in the examples of the present disclosure.

Infrared detection data of the carbon nanostructure-containing composite are based on GBT 7286.1-1987 "Test method for total normal emittance of metals and nonmetallic materials".

Bacteria inhibition test data of the carbon nanostructure-containing composite are based on the test method according to GB/T20944.3-2008, taking *Staphylococcus aureus* as an example.

The present disclosure provides a method for preparing a latex containing a graphene structure, which comprises the following steps: mixing the raw materials including natural latex, a vulcanizing agent, an anti-aging agent, an antioxidant, and a vulcanization accelerator, etc., stirring them uniformly, and introducing a substance containing a graphene structure and non-carbon non-oxygen non-hydrogen elements; synchronously mixing is also possible.

The graphene structure of the present disclosure is preferably introduced in a form of a mixture, which preferably comprises a non-graphene-structure component, such as amorphous carbon component.

For the carbon nanostructure-containing composite, a typical but non-limiting example may be any one or a combination of at least two of substance 1, substance 2, substance 3 or substance 4 having properties described in Table A:

TABLE A

| Items | Performance indicators | | | |
| --- | --- | --- | --- | --- |
| | Substance 1 | Substance 2 | Substance 3 | Substance 4 |
| Conductivity, S/m | 2800-8000 | 5000-8000 | 2800-4000 | 3000-8000 |
| Specific surface area, $m^2/g$ | ≤150 | ≤150 | ≤300 | ≤250 |
| Raman spectrum, IG/ID | ≤2.0 | ≤3.0 | ≤2.0 | ≤2.0 |
| C/O | ≤35.0 | ≤40.0 | ≤35.0 | ≤40.0 |
| Ash, % | 1.0-4.0 | 2.0-4.0 | 1.0-2.5 | 1.0-2.0 |
| Fe, % | 0.1-0.5 | 0.1-0.5 | 0.1-0.5 | 0.1-0.5 |
| Si, % | 0.05-0.3 | 0.05-0.3 | 0.05-0.3 | 0.05-0.3 |
| Al, % | 0.05-0.4 | 0.05-0.4 | 0.05-0.4 | 0.05-0.4 |

In Table A, IG/ID is the peak height ratio of G peak to D peak in the Raman spectrum.

Those skilled in the art should understand that the performance indicators of the carbon nanostructure-containing composite listed in Table A all refer to the indicators of the powder of the carbon nanostructure-containing composite. If the carbon nanostructure-containing composite is a slurry, the above indicators are the indicators of the powder before preparing the slurry.

When the carbon nanostructure-containing composite is powder, the carbon nanostructure-containing composite powder has the following properties in addition to the performance indicators described in Table A:
black powder, uniform fineness, without obvious large particles, water content≥3.0%, particle size D90≥10.0 μm, pH 5.0 to 8.0, and apparent density of 0.2 to 0.4 $g/cm^3$.

When the carbon nanostructure-containing composite is a slurry, it is a product obtained by dispersing carbon nanostructure-containing composite in a solvent, and the carbon nanostructure-containing composite slurry has the following properties in addition to the performance indicators described in Table A:
solid content of 1.0-10.0%, particle size D50≥0.7 um, pH 8.0 to 10.0, Zeta potential≥−10 mV, and viscosity of 5.0 to 8.0 mpa·s.

The present disclosure provides an article containing the modified latex described in any one of the above technical solutions, or the modified latex prepared by the preparation method according to any one of the above technical solutions. The article preferably includes pillows, mattresses, cushions, back cushions, sofas, waist supports, insoles, brassieres, car seats, toilet seat cushions, condoms, gloves, balloons, nipples, feeding bottles or hand warmers.

For the modified latex and its preparation method and application article provided by the present disclosure, a graphene structure and non-carbon non-oxygen non-hydrogen elements are introduced in the traditional latex; by means of collocation and combination of a graphene structure and elements of Fe, Si and Al, the modified latex provided by the present disclosure is enabled to have multiple properties such as far infrared property, bacteria resistance and inhibition properties; and by controlling a specific adding proportion, the modified latex provided by the present disclosure can have a higher far infrared effect and bacteria inhibition effect. In addition, a substance containing a graphene structure and non-carbon non-oxygen non-hydrogen elements is introduced in the form of a carbon nanostructure-containing composite in the present disclosure, and in the process of introduction, it is not necessary to carry out the pretreatment of the substance such as activation, and modification, etc., to achieve the effective combination with the latex and bring about additionally enhanced far infrared effect and bacteria inhibition effect.

The far infrared property and bacteria resistance of the modified latex are detected in the present disclosure, and the testing standards are as follows:
infrared detection data are based on GBT 7286.1-1987 "Test method for total normal emittance of metals and nonmetallic materials";
bacteria inhibition detection data are tested according to GB/T 31402-2015 "Test Methods for Antibacterial Properties of Plastics and Plastic Surface", exemplified by *Staphylococcus aureus*.

Experimental results show that the far infrared property of the modified latex provided by the present disclosure can reach a maximum of 0.93; and the bacteria inhibition property can reach a maximum of 99%.

In order to further explain the present disclosure, the modified latex and its preparation method and application provided by the present disclosure are described in detail in combination with examples below, and the protection scope of the present disclosure is not limited by the following examples.

Example 1

A carbon nanostructure-containing composite was obtained by the following method:
(1) mixing corncob cellulose and ferrous chloride in a mass ratio of 1:1, stirring at 150° C. and catalyzing for 4 hours, drying until the water content of the precursor being 10 wt %, to obtain a precursor;
(2) under a protective atmosphere, heating the precursor to 170° C. at a heating rate of 3° C./min, and maintaining the temperature for 2 hours, then heating by temperature programming to 400° C. and maintaining the temperature for 3 hours, and then heating to 1200° C. and maintaining the temperature for 3 hours to obtain a crude product; wherein the heating rate of the temperature programming was 15° C./min;
(3) at a temperature of 55 to 65° C., washing the crude product with sodium hydroxide solution having a concentration of 10% and with hydrochloric acid having a concentration of 4 wt % and then with water to obtain a carbon nanostructure-containing composite.

The carbon nanostructure-containing composite prepared in Example 1 was determined by Raman spectrum, and the results show that the peak height ratio of G peak to D peak is 3.

It is determined by the "first method for determining the content of non-carbon non-oxygen non-hydrogen elements" that the carbon nanostructure-containing composite primarily comprises elements of P, Si, Ca, Al, Fe and Mg.

Example 2

Corncob cellulose in Example 1 was replaced with reed cellulose.

The carbon nanostructure-containing composite prepared in Example 2 was determined by Raman spectrum, and the results show that the peak height ratio of G peak to D peak is 4.8;

It is determined by the "first method for determining the content of non-carbon non-oxygen non-hydrogen elements" that the carbon nanostructure-containing composite primarily comprises elements of Si, Ca, Al, Fe, Mg and S.

Example 3

Corncob cellulose in Example 1 was replaced with poplar cellulose.

The carbon nanostructure-containing composite prepared in Example 3 was determined by Raman spectrum, and the results show that the peak height ratio of G peak to D peak is 4.6;

It is determined by the "first method for determining the content of non-carbon non-oxygen non-hydrogen elements" that the carbon nanostructure-containing composite primarily comprises elements of P, Si, Al, Na, Fe and Ni.

Example 4

Corncob cellulose in Example 1 was replaced with corncob lignin.

The carbon nanostructure-containing composite prepared in Example 4 was determined by Raman spectrum, and the results show that the peak height ratio of G peak to D peak is 2.8;

It is determined by the "first method for determining the content of non-carbon non-oxygen non-hydrogen elements" that the carbon nanostructure-containing composite primarily comprises elements of P, Si, Ca, Al, Na, Fe, Mg, Fe, Mg and K.

Example 5

The ready-to-use corncob material was added to 3-fold amount of 44% zinc chloride solution (adjusted to pH=1 with hydrochloric acid), thoroughly stirred and impregnated, and stood still to absorb for 5 hours. The mixture was again thoroughly stirred and stood still to absorb for 5 hours until zinc chloride solution was completely absorbed. The mixture was then transferred into an open flat carbonization furnace for sealed carbonization at 400° C. for 3 hours, thoroughly stirred about every 30 minutes. The temperature of the furnace was reduced to below 100° C. before stirring, and then raised for sealed carbonization after stirring until black coke was formed. Then the mixture was discharged and cooled, impregnated with 44% zinc chloride solution (pH=1) in a 2-fold amount, fully stirred, so that the zinc chloride solution was completely absorbed. The resulting mixture was transferred into an activation furnace to activate at 650° C. for 70 minutes, and then discharged and cooled, transferred into a wooden barrel. Then an equal amount of 40% ammonium chloride solution was added thereto. The resulting mixture was thoroughly stirred and washed, stood and clarified, and the supernatant was siphoned, then washed with 30%, 12% and 3% ammonium chloride solution successively under stirring, then with an equal amount of 30% hydrochloric acid. Carbon granules were filtered out and put into a kettle, and an equal volume of clear water was added thereto. The mixture was boiled and washed until there was no ammonium chloride, and then heated and evaporated, stirred and stir-fried to remove moisture, oven-dried and pulverized, screened with a 120-mesh sieve to obtain active carbon. Graphene was introduced on such a basis, and nano-materials containing P, Si, Ca, Al, Fe and Mg were added, specifically the materials such as nano-phosphorus pentoxide, nano-silicon powder, nano-calcium carbonate, nano-aluminum oxide, nano-iron and nano-magnesium powder were added, to obtain a carbon nanostructure-containing composite.

Example 6

The lignin was sealed and carbonized in a carbonization furnace at 400° C. for 3 hours, thoroughly stirred about every 30 minutes. The temperature of the furnace was reduced to below 100° C. before stirring, and raised to 2200° C. under an argon gas condition after stirring, then the carbonization furnace was sealed to graphitize for 2 hours. The resulting material was discharged and cooled, washed with 30%, 12% and 3% ammonium chloride solution successively under stirring, then with an equal amount of 30% hydrochloric acid, oven-dried and pulverized, screened with a 120-mesh sieve to obtain a mixed carbon material of graphite and active carbon. Graphene was introduced on such a basis, and nano-materials containing P, Si, Ca, Al, Fe and Mg were added, specifically the materials such as nano-phosphorus pentoxide, nano-silicon dioxide, nano-calcium carbonate, nano-aluminium powder, nano-iron and nano-magnesium carbonate were added, to obtain a carbon nanostructure-containing composite.

Example 7

Phenolic resin foam plate was used to carbonize once at 330° C. to remove hydrogen and oxygen elements, then to carbonize at a high temperature of 700° C. Graphene was introduced on such a basis, and nano-materials containing P, Si, Ca, Al, Fe and Mg were added to obtain a carbon nanostructure-containing composite.

Example 8

Active carbon and graphene were added to nano-graphite, and nano-materials containing P, Si, Ca, Al, Fe and Mg were added, specifically the materials of nano-phosphorus pentoxide, nano-silicon powder, nano-aluminum powder, nano-iron and nano-magnesium powder were added to obtain a carbon nanostructure-containing composite.

Example 9

(1) Preparation of Porous Cellulose:

At a temperature of 90° C., an aqueous solution of corncobs was adjusted to pH=3 with sulfuric acid, soaked for 10 minutes for hydrolysis to obtain lignocellulose, wherein the mass of sulfuric acid was 3% of that of the corncobs; and then the resulting lignocellulose was soaked in acidic sulphite at 70° C. for 1 hour to obtain porous cellulose; wherein the acid was sulfuric acid and the sulphite was magnesium sulfite; the mass of sulfuric acid was 4% of that of the lignocellulose and the liquid-solid ratio was 2:1, the porous cellulose was made for ready use (this step can make reference to the patent document with Publication Number CN104016341A).

(2) the porous cellulose obtained in step (1) was mixed with ferric chloride in a mass ratio of 1:1, then stirred at 200° C. and catalyzed for 8 hours, dried until the water content of the precursor was 4 wt % to obtain a precursor; then the precursor was heated to 350° C. at a heating rate of 5° C./min under a protective atmosphere, and maintained at that temperature for 2 hours, then heated by temperature programming to 1000° C. at a heating rate of 20° C./min, and maintained at that temperature for 4 hours to obtain a crude product; at a temperature of 55 to 65° C., the crude product was acid washed with hydrochloric acid having a concentration of 4 wt %, then water washed to obtain a carbon nanostructure-containing composite.

The carbon nanostructure-containing composite prepared in Example 9 was determined by Raman spectrum, and the results show that the peak height ratio of G peak to D peak is 6.8;

It is determined by the "first method for determining the content of non-carbon non-oxygen elements" that the carbon nanostructure-containing composite primarily comprises elements of P, Si, Ca, Al, Na, Fe, Mg, Fe, Mg and K.

Example 10

The difference from Example 9 is that the step (2) is: the porous cellulose obtained in step (1) of Example 9 was mixed with manganese chloride in a mass ratio of 1:5, then stirred at 180° C. and catalyzed for 5 hours, dried until the water content of the precursor was 6 wt % to obtain a precursor; then under a protective atmosphere, the precursor was heated to 300° C. at a heating rate of 4° C./min and maintained at that temperature for 3 hours, then heated by temperature programming to 1000° C. at a heating rate of 17° C./min, and maintained at that temperature for 4 hours to obtain a crude product; at a temperature of 60° C., the crude product was acid washed with hydrochloric acid having a concentration of 5 wt %, then water washed to obtain a carbon nanostructure-containing composite.

The carbon nanostructure-containing composite prepared in Example 10 was determined by Raman spectrum, and the results show that the peak height ratio of G peak to D peak is 15;

It is determined by the "first method for determining the content of non-carbon non-oxygen elements" that the carbon nanostructure-containing composite primarily comprises elements of P, Si, Ca, Al, Na, Fe, Mg, Mn and S.

Example 11

(1) After wheat straw was pulverized, the treated wheat straw was cooked using an organic acid solution of formic acid and acetic acid having a total acid concentration of 80 wt %, the mass ratio of acetic acid to formic acid in the organic acid solution of the present example was 1:12, and hydrogen peroxide ($H_2O_2$) in an amount of 1 wt % of the wheat straw raw material was added as a catalyst before the raw material was added, and the reaction temperature was controlled at 120° C. to react for 30 minutes, with a solid-liquid mass ratio of 1:10. The obtained reaction solution was subjected to a first solid-liquid separation. The solid obtained by the first solid-liquid separation was added to an organic acid solution of formic acid and acetic acid having a total acid concentration of 75 wt % for acid washing for 1 hour, wherein hydrogen peroxide ($H_2O_2$) in an amount of 8 wt % of the wheat straw raw material was added to the organic acid solution having a total acid concentration of 75 wt % as a catalyst and the mass ratio of acetic acid to formic acid was 1:12, the temperature was controlled at 90° C., and the solid-liquid mass ratio was 1:9. The reaction solution was subjected to a second solid-liquid separation. The liquids obtained by the first and second solid-liquid separations were collected and evaporated at high temperature and high pressure of 120° C. and 301 kPa until dryness. The formic acid and acetic acid vapors thus obtained were condensed and refluxed to the reaction kettle of step (1) as cooking liquor for the cooking in step (1). The solid obtained by the second solid-liquid separation was collected and washed with water. The temperature for water washing was controlled at 80° C., and the water washed pulp had a concentration of 6 wt % and was subjected to a third solid-liquid separation. The liquid obtained by the third solid-liquid separation was collected, subjected to water and acid distillation, and the resulting mixed acid solution was returned to the reaction kettle of step (1) as cooking liquor for the cooking in step (1), and the resulting water was returned to step (5) for the water washing. The solid obtained by the third solid-liquid separation was collected and screened to obtain the desired fine pulp cellulose (this step can make reference to the patent document with Publication Number CN103898782A).

(2) the porous cellulose obtained in Preparation Example 2 was mixed with ferrous chloride in a mass ratio of 1:0.1, then stirred at 150° C. and catalyzed for 4 hours, dried until the water content of the precursor was 10 wt % to obtain a precursor; then under a protective atmosphere, the precursor was heated to 280° C. at a heating rate of 3° C./min and maintained at that temperature for 2 hours, then heated by temperature programming to 950° C. at a heating rate of 15° C./min, and maintained at that temperature for 3 hours to obtain a crude product; at a temperature of 55 to 65° C., the crude product was acid washed with hydrochloric acid having a concentration of 4 wt %, then water washed to obtain a carbon nanostructure-containing composite.

The carbon nanostructure-containing composite prepared in Example 11 was determined by Raman spectrum, and the results show that the peak height ratio of G peak to D peak is 3;

It was determined by the "first method for determining the content of non-carbon non-oxygen elements" that the carbon nanostructure-containing composite primarily comprises elements of P, Si, Ca, Al, Na, Fe, and Mg.

Example 12

The difference from Example 11 is that the step (2) is: the cellulose obtained in step (1) of Example 11 was mixed with ferric chloride in a mass ratio of 1:1, then stirred at 200° C. and catalyzed for 8 hours, dried until the water content of the precursor was 8 wt % to obtain a precursor; then under a protective atmosphere, the precursor was heated to 350° C. at a heating rate of 5° C./min and maintained at that temperature for 2 hours, then heated by temperature programming to 1050° C. at a heating rate of 20° C./min, and maintained at that temperature for 4 hours to obtain a crude product; at a temperature of 55 to 65° C., the crude product was acid washed with hydrochloric acid having a concentration of 6 wt %, then water washed to obtain a carbon nanostructure-containing composite.

The carbon nanostructure-containing composite prepared in Example 12 was determined by Raman spectrum, and the results show that the peak height ratio of G peak to D peak is 4.8;

It is determined by the "first method for determining the content of non-carbon non-oxygen elements" that the carbon nanostructure-containing composite primarily comprises elements of P, Si, Ca, Al, Na, Fe, and Mg.

Example 13

(1) After poplar or eucalyptus branches and leaves were pulverized, the treated lignocellulosic biomass was acid hydrolyzed using an organic acid solution containing 90% formic acid, 5% acetic acid and 5% water, wherein the reaction temperature was controlled at 165° C. and the reaction was conducted for 10 minutes, and the liquid-solid mass ratio of the mixed acid solution of formic acid and acetic acid and the biomass raw material was 1:20. The obtained reaction solution was subjected to a first solid-liquid separation. The solid obtained by the separation in step (1) was added to an organic acid solution containing 90% formic acid, 5% acetic acid and 5% water for acid washing at a temperature of 60 to 80° C. for 0.5 to 1 hour. Then the reaction liquid was subjected to a second solid-liquid separation. The separated solid was subjected to water washing to obtain the desired cellulose. (3) The liquid obtained by the solid-liquid separation in step (1) and step (2) was collected, subjected to vacuum distillation to concentrate to obtain formic acid and acetic acid vapors, and a concentrated liquid having a concentration of 4 to 5 times that of the original liquid. (4) The formic acid and acetic acid vapors distilled out in step (3) were condensed and returned to the reaction kettle of step (1) for the acid hydrolysis in step (1). (5) The concentrated liquid obtained in step (3) was dilute with water, and the mass ratio of the auxiliary agent to the concentrated liquid was 2:1. The resulting mixture was controlled at a temperature of 60 to 70° C. and stirred for 0.5 to 1 hour, and then subjected to a third solid-liquid separation. Water was added to the obtained solid (the mass ratio of water to the solid was 3:1), and the resulting mixture was stirred at 75 to 80° C. for 2 to 3 hours for water washing and de-esterifying to obtain the desired lignin (this step can make reference to the Publication Number CN103131018A entitled "Comprehensive utilization process of a lignocellulosic biomass").

(2) the poplar cellulose obtained in Preparation Example 3 was mixed with ferric chloride in a mass ratio of 1:1, then stirred at 200° C. and catalyzed for 8 hours, dried until the water content of the precursor was 8 wt % to obtain a precursor; then under a protective atmosphere, the precursor was heated to 350° C. at a heating rate of 5° C./min and maintained at that temperature for 2 hours, then heated by temperature programming to 1050° C. at a heating rate of 20° C./min, and maintained at that temperature for 4 hours to obtain a crude product; at a temperature of 55 to 65° C., the crude product was acid washed with hydrochloric acid having a concentration of 6 wt %, then with water to obtain a carbon nanostructure-containing composite.

The carbon nanostructure-containing composite prepared in Example 13 was determined by Raman spectrum, and the results show that the peak height ratio of G peak to D peak is 4.6;

It is determined by the "first method for determining the content of non-carbon non-oxygen elements" that the carbon nanostructure-containing composite primarily comprises elements of P, Si, Ca, Al, Na, Fe, Mg, Ni and K.

Example 14

The difference from Example 13 is that the step (2) is: the eucalyptus cellulose obtained in step (1) of Example 13 was mixed with nickel chloride in a mass ratio of 1:0.5, then stirred at 170° C. and catalyzed for 5 hours, dried until the water content of the precursor was 6 wt % to obtain a precursor; then under a protective atmosphere, the precursor was heated to 300° C. at a heating rate of 4° C./min and maintained at that temperature for 3 hours, then heated by temperature programming to 1000° C. at a heating rate of 17° C./min, and maintained at that temperature for 4 hours to obtain a crude product; at a temperature of 60° C., the crude product was acid washed with hydrochloric acid having a concentration of 5 wt %, then water washed to obtain a carbon nanostructure-containing composite.

The carbon nanostructure-containing composite prepared in Example 14 was determined by Raman spectrum, and the results show that the peak height ratio of G peak to D peak is 2.1;

It is determined by the "first method for determining the content of non-carbon non-oxygen elements" that the carbon nanostructure-containing composite primarily comprises elements of P, Si, Ca, Al, Na, Fe, Mg, Ni and K.

Examples 15-16

The difference from Example 13 is that the step (2) is: the poplar cellulose obtained in Preparation Example 3 was mixed with ferrous chloride in a mass ratio of 1:3, then stirred at 180° C. and catalyzed for 5 hours, dried until the water content of the precursor was 6 wt % to obtain a precursor; then under a protective atmosphere, the precursor was heated to 300° C. at a heating rate of 4° C./min and maintained at that temperature for 3 hours, then heated by temperature programming to 1000° C. at a heating rate of 17° C./min, and maintained at that temperature for 4 hours to obtain a crude product; at a temperature of 60° C., the crude product was acid washed with hydrochloric acid having a concentration of 5 wt %, then water washed to obtain a carbon nanostructure-containing composite.

The carbon nanostructure-containing composite prepared in Example 15 was determined by Raman spectrum, and the results show that the peak height ratio of G peak to D peak is 2.1;

It is determined by the "first method for determining the content of non-carbon non-oxygen elements" that the carbon nanostructure-containing composite primarily comprises elements of P, Si, Ca, Al, Na, Fe, Mg, Ni and K.

Comparative Example 1

The graphene obtained according to Example 7 disclosed in CN104016341A entitled "A preparation method of porous graphene" was used as Comparative Example 1. The graphene prepared in Comparative Example was determined with by Raman spectrum, and the results show that the peak height ratio of G peak to D peak is 13.

Comparative Example 2

A phosphorus-doped graphene was prepared according to a method disclosed in CN103508444A, specifically:

1 g of graphite with a purity of 95% was added to 24 ml of concentrated nitric acid with a mass fraction of 65% and 90 ml of concentrated sulfuric acid with a mass fraction of 98% and mixed. The mixture was stirred in an ice-water bath for 20 minutes, and then potassium permanganate was slowly added to the mixture with a mass ratio of potassium permanganate to graphite of 5:1, the mixture was stirred for 1 hour, then heated to 85° C. for 30 minutes. Then deionized water was added thereto and the resulting mixture was maintained at 85° C. for 30 minutes, wherein the liquid-to-solid ratio of deionized water to graphite was 90 mL:1 g. Finally hydrogen peroxide solution with a mass fraction of 30% was added and the mixture was stirred for 10 minutes, wherein the liquid-to-solid ratio of hydrogen peroxide solution to graphite was 10 mL:1 g. Then the mixture was filtered by suction, and the solids were washed successively with dilute hydrochloric acid and deionized water for three times in total, wherein the solid-liquid ratio of dilute hydrochloric acid, deionized water and graphite was 100 mL:150 mL:1 g. Finally the solid matter was dried in a vacuum oven at 60° C. for 12 hours to obtain graphite oxide. The graphite oxide and phosphorus pentoxide were mixed uniformly at a mass ratio of 1:2, and the mixture was placed in an argon atmosphere with a flow rate of 300 ml/min, then heated to 900° C. at a heating rate of 15° C./min for 2 hours, subsequently cooled to room temperature in an argon atmosphere with a flow rate of 300 ml/min to obtain phosphorus-doped graphene.

The phosphorus-doped graphene prepared in Comparative Example 2 was determined by Raman spectrum, and the results show that the peak height ratio of G peak to D peak is 5.

It is determined by the "first method for determining the content of non-carbon non-oxygen non-hydrogen elements" that the obtained phosphorus-doped graphene primarily comprises element P.

Comparative Example 3

Parallel Comparative Experimental Example

Using an active carbon/graphene composite and its preparation method disclosed in Example 1 of CN104118874A, a composite of active carbon and graphene was prepared.

The active carbon/graphene composite prepared in Comparative Example 3 was determined by Raman spectrum, and the results showed that the peak height ratio of G peak to D peak is 0.5.

It is determined by the "first method for determining the content of non-carbon non-oxygen non-hydrogen element" that the obtained active carbon/graphene composite comprises elements of S, N and Cl.

A latex was prepared using the products obtained by Examples 1-15 and Comparative Examples 1-3.

Taking the preparation of latex pillows as an example, 85-100 parts of natural latex, 3-5 parts of vulcanizing agent, 0.1-0.2 parts of natural essential oil, 5-8 parts of gelling agent, 2-3 parts of antioxidant, and 1-2 parts of sodium stearate were mixed uniformly with 0.5-10 parts of the products obtained in Examples 1 to 15 and Comparative Examples 1 to 3, and helium gas was introduced into the resulting liquid raw materials, and the resulting mixture was continuously stirred to form foam. Then the foam was introduced into the inner cavity of the pillow mold through a pipe. When the inner cavity of the pillow mold was filled with foam, the mold was closed and sealed. Since the density of helium gas is small, it can improve the elasticity and support property of the latex pillow when enclosed in the foam, thereby improving the comfort for sleep. The pillow mold was moved to a heating chamber, in which high-temperature steam was charged, so that the foam inside the pillow mold can solidify, then it was removed from the heating chamber, opened after cooling to obtain a shaped latex pillow.

Specifically, latex pillows were prepared based on, for example, 100 parts of natural latex, 3 parts of vulcanizing agent, 0.1 part of natural essential oil, 5 parts of gelling agent, 2 parts of antioxidant and 1 part of sodium stearate, and products obtained in Examples 1 to 15 and Comparative Examples 1 to 3 being in an amount of 0.1 wt %, 1 wt %, 3 wt %, 5 wt %, 10 wt %, and 12 wt % of the natural latex.

The far infrared property and bacteria resistance of the latex pillows are detected, and the testing standards are as follows:

The infrared detection data are based on GBT 7286.1-1987 "Test method for total normal emittance of metals and nonmetallic materials";

Bacteria inhibition detection data are tested according to GB/T 31402-2015 "Test Methods for Antibacterial Properties of Plastics and Plastic Surface", exemplified by *Staphylococcus aureus*.

Test Results:

Latex Pillows Prepared Under the Condition that the Products Obtained in Examples 1-15 and Comparative Examples 1-3 were Added in an Amount of 0.1 wt %:

| Raw materials | The sum of the contents of elements Fe, Si and Al in latex pillows, wt % | Far infrared property (Normal emissivity) | Antibacterial rate % |
| --- | --- | --- | --- |
| Example 1 | 0.0046 | 0.86 | 88 |
| Example 2 | 0.0037 | 0.83 | 90 |
| Example 3 | 0.0042 | 0.84 | 90 |
| Example 4 | 0.0053 | 0.84 | 90 |
| Example 5 | 0.0018 | 0.80 | 80 |
| Example 6 | 0.0038 | 0.81 | 80 |
| Example 7 | 0.0052 | 0.81 | 80 |
| Example 8 | 0.0047 | 0.83 | 80 |
| Example 9 | 0.0055 | 0.87 | 90 |
| Example 10 | 0.0056 | 0.86 | 89 |
| Example 11 | 0.0053 | 0.88 | 88 |
| Example 12 | 0.0053 | 0.88 | 88 |
| Example 13 | 0.0056 | 0.85 | 88 |
| Example 14 | 0.0073 | 0.85 | 89 |
| Example 15 | 0.0068 | 0.85 | 87 |
| Comparative Example 1 | — | 0.70 | 40 |
| Comparative Example 2 | — | 0.70 | 45 |
| Comparative Example 3 | — | 0.71 | 40 |

Latex Pillows Prepared with an Adding Amount of 1 wt %:

| Raw materials | The sum of the contents of elements Fe, Si and Al in latex pillows, wt % | Far infrared property (Normal emissivity) | Antibacterial rate % |
| --- | --- | --- | --- |
| Example 1 | 0.045 | 0.88 | 90 |
| Example 2 | 0.035 | 0.83 | 92 |
| Example 3 | 0.04 | 0.84 | 92 |
| Example 4 | 0.05 | 0.85 | 93 |
| Example 5 | 0.025 | 0.80 | 82 |
| Example 6 | 0.035 | 0.81 | 84 |
| Example 7 | 0.05 | 0.81 | 85 |
| Example 8 | 0.045 | 0.83 | 84 |

| Raw materials | The sum of the contents of elements Fe, Si and Al in latex pillows, wt % | Far infrared property (Normal emissivity) | Antibacterial rate % |
|---|---|---|---|
| Example 9 | 0.052 | 0.89 | 92 |
| Example 10 | 0.054 | 0.89 | 94 |
| Example 11 | 0.048 | 0.90 | 95 |
| Example 12 | 0.049 | 0.90 | 92 |
| Example 13 | 0.051 | 0.88 | 94 |
| Example 14 | 0.071 | 0.87 | 93 |
| Example 15 | 0.068 | 0.88 | 93 |
| Comparative Example 1 | — | 0.77 | 46 |
| Comparative Example 2 | — | 0.75 | 45 |
| Comparative Example 3 | — | 0.73 | 30 |

Latex Pillows Prepared with an Adding Amount of 3 wt %:

| Raw materials | The sum of the contents of elements Fe, Si and Al in latex pillows % | Far infrared property (Normal emissivity) | Antibacterial rate % |
|---|---|---|---|
| Example 1 | 0.13 | 0.92 | 95 |
| Example 2 | 0.1 | 0.86 | 96 |
| Example 3 | 0.12 | 0.88 | 96 |
| Example 4 | 0.15 | 0.89 | 97 |
| Example 5 | 0.07 | 0.81 | 87 |
| Example 6 | 0.09 | 0.82 | 88 |
| Example 7 | 0.14 | 0.82 | 89 |
| Example 8 | 0.13 | 0.84 | 85 |
| Example 9 | 0.15 | 0.92 | 97 |
| Example 10 | 0.16 | 0.92 | 97 |
| Example 11 | 0.14 | 0.93 | 96 |
| Example 12 | 0.15 | 0.92 | 96 |
| Example 13 | 0.15 | 0.91 | 96 |
| Example 14 | 0.20 | 0.93 | 98 |
| Example 15 | 0.20 | 0.92 | 98 |
| Comparative Example 1 | — | 0.77 | 46 |
| Comparative Example 2 | — | 0.75 | 45 |
| Comparative Example 3 | — | 0.70 | 30 |

Latex Pillows Prepared with an Adding Amount of 5 wt %:

| Raw materials | The sum of the contents of elements Fe, Si and Al in latex pillows % | Far infrared property (Normal emissivity) | Antibacterial rate % |
|---|---|---|---|
| Example 1 | 0.22 | 0.93 | 99 |
| Example 2 | 0.17 | 0.87 | 99 |
| Example 3 | 0.20 | 0.89 | 99 |
| Example 4 | 0.25 | 0.89 | 97 |
| Example 5 | 0.12 | 0.82 | 80 |
| Example 6 | 0.17 | 0.83 | 88 |
| Example 7 | 0.25 | 0.83 | 81 |
| Example 8 | 0.22 | 0.84 | 88 |
| Example 9 | 0.26 | 0.93 | 99 |
| Example 10 | 0.27 | 0.93 | 99 |
| Example 11 | 0.24 | 0.93 | 99 |
| Example 12 | 0.24 | 0.93 | 99 |
| Example 13 | 0.25 | 0.93 | 99 |
| Example 14 | 0.35 | 0.93 | 99 |
| Example 15 | 0.34 | 0.93 | 99 |
| Comparative Example 1 | — | 0.73 | 52 |
| Comparative Example 2 | — | 0.74 | 55 |
| Comparative Example 3 | — | 0.71 | 30 |

Latex Pillows Prepared with an Adding Amount of 10 wt %:

| Raw materials | The sum of the contents of elements Fe, Si and Al in latex pillows % | Far infrared property (Normal emissivity) | Antibacterial rate % |
|---|---|---|---|
| Example 1 | 0.42 | 0.90 | 97 |
| Example 2 | 0.35 | 0.89 | 99 |
| Example 3 | 0.39 | 0.89 | 98 |
| Example 4 | 0.46 | 0.86 | 90 |
| Example 5 | 0.25 | 0.87 | 70 |
| Example 6 | 0.35 | 0.87 | 64 |
| Example 7 | 0.45 | 0.83 | 43 |
| Example 8 | 0.43 | 0.84 | 49 |
| Example 9 | 0.48 | 0.87 | 90 |
| Example 10 | 0.51 | 0.88 | 90 |
| Example 11 | 0.45 | 0.88 | 90 |
| Example 12 | 0.48 | 0.88 | 89 |
| Example 13 | 0.50 | 0.88 | 89 |
| Example 14 | 0.71 | 0.87 | 89 |
| Example 15 | 0.68 | 0.87 | 89 |
| Comparative Example 1 | — | 0.75 | 10 |
| Comparative Example 2 | — | 0.73 | 10 |
| Comparative Example 3 | — | 0.71 | 10 |

Latex Pillows Prepared with an Adding Amount of 12 wt %:

| Raw materials | The sum of the contents of elements Fe, Si and Al in latex pillows % | Far infrared property (Normal emissivity) | Antibacterial rate % |
|---|---|---|---|
| Example 1 | 0.52 | 0.80 | 77 |
| Example 2 | 0.40 | 0.78 | 66 |
| Example 3 | 0.42 | 0.78 | 67 |
| Example 4 | 0.60 | 0.79 | 75 |
| Example 5 | 0.30 | 0.77 | 50 |
| Example 6 | 0.40 | 0.77 | 54 |
| Example 7 | 0.57 | 0.78 | 53 |
| Example 8 | 0.51 | 0.76 | 49 |
| Example 9 | 0.60 | 0.75 | 70 |
| Example 10 | 0.61 | 0.77 | 70 |
| Example 11 | 0.55 | 0.77 | 70 |
| Example 12 | 0.57 | 0.76 | 69 |
| Example 13 | 0.60 | 0.78 | 69 |
| Example 14 | 0.81 | 077 | 69 |
| Example 15 | 0.80 | 0.79 | 69 |
| Comparative Example 1 | — | 0.73 | 0 |
| Comparative Example 2 | — | 0.74 | 0 |
| Comparative Example 3 | — | 0.72 | 0 |

After the introduction of graphene structure and non-carbon non-oxygen non-hydrogen elements such as Fe, Si, and Al, etc., during the preparation of the latex, a series of subsequent steps are required as well. Therefore, the content of non-carbon non-oxygen non-hydrogen elements such as Fe, Si, and Al, etc., is not correspondingly the same direct proportion to the carriers or mixtures or composites which introduce the substance. For example, in the case that graphene structure and non-carbon non-oxygen non-hydrogen elements are introduced in the form of a carbon nanostructure-containing composite, when the adding amount of the carbon nanostructure-containing composite is 1 wt % of the latex, elements of Fe, Si, and Al are contained in an amount of 0.2 wt % of the latex pillow; and when the adding amount of the carbon nanostructure-containing composite is 3 wt % of the latex, elements of Fe, Si, and Al are contained in an amount of 0.5 wt % of the latex. Therefore, the graphene structure and the type and content of non-carbon non-oxygen non-hydrogen elements contained in the latex play a key role in the far infrared and antibacterial properties of the latex. When the adding amount exceeds 10 wt %, uneven dispersion is obviously appeared in the prepared pillows, which will affect the performance.

As can be seen from the above examples and comparative examples, many trace elements exist in the plant itself, and if the substances containing a graphene structure and trace elements are directly prepared by using the plant itself, the individual components in the product are more uniformly dispersed, such as trace elements, and the effect that can be achieved when combined with a polymer material or the like is more excellent; and if trace elements were introduced in a later stage, the effect would be more obvious only when the mixing is more uniform, and the effect is worse than the that of the naturally mixed ones.

Comparative Examples 4-6

The modified latex pillows were produced by using nano carbon black (Zhengzhou Tairui Chemical Industry Limited Company, model TR1800), nano flaky graphite (Qingdao Tianyue Graphite Co., Ltd., 1000 mesh) and purchased graphene (The Sixth Element (Changzhou) Materials Technology Co., Ltd., Model SE1331), respectively, wherein the nano-carbon black, nano flaky graphite, and purchased graphene each accounts for 1 wt % of the modified latex pillow.

The heating measurement was carried out for the modified latex pillows prepared in Example 1 and these pillows prepared in Comparative Examples 4-6. The results are as follows:
Basic Experimental Conditions:
Room temperature: 17° C.;
Humidity: 85%;
Height of infrared lamp from the desktop: 51 cm
Infrared lamp model: PHILIPS
FIG. 1 shows the temperature-time curves of different types of graphene pillows It can be seen that the modified latex prepared by using the materials obtained in Example 1 of the present disclosure was the best when compared with the Comparative Examples 4-6 in terms of the heating effects, which proves indirectly that the far infrared property thereof is good.

According to the bacteria inhibition detection method in this application, the Comparative Examples 4-6 were tested, and the bacteria inhibition rates were 30%, 20%, and 30%, respectively.

A graphene structure-containing modified latex and its preparation method and application article provided by the present disclosure are described in detail hereinbefore. Specific examples are used herein to describe the principles and embodiments of the present disclosure. The above embodiments are only used to facilitate the understandings of the methods and the key ideas of the present disclosure. It should be noted that several improvements and modifications may be made by an ordinary person skilled in the art without departing from the principles of the present disclosure, and that such improvements and modifications also fall within the protection scope of the appended claims of the present disclosure.

What is claimed is:

1. A modified latex comprising:
a graphene structure; and
non-carbon non-oxygen non-hydrogen elements, the non-carbon non-oxygen non-hydrogen elements comprising elements of Fe, Si, and Al; the elements of Fe, Si, and Al in total accounts for 0.0018 wt % to 0.4 wt % of the modified latex;
wherein the graphene structure and the non-carbon non-oxygen non-hydrogen elements are introduced in a form of a carbon nanostructure-containing composite;
wherein the carbon nanostructure-containing composite comprises:
graphene;
amorphous carbon; and
non-carbon non-oxygen non-hydrogen elements, the non-carbon non-oxygen non-hydrogen elements comprising elements of Fe, Si, and Al; and the content of non-carbon non-oxygen non-hydrogen elements is 0.5 wt % to 6 wt % of the carbon nanostructure-containing composite;
wherein the graphene structure has a thickness of less than or equal to 100 nanometers;
wherein the mass of the carbon nanostructure-containing composite accounts for 3 wt % to 5 wt % of that of the modified latex.

2. The modified latex according to claim 1, wherein the content of carbon element in the carbon nanostructure-containing composite is greater than or equal to 80 wt %.

3. The modified latex according to claim 1, wherein the non- carbon non-oxygen non-hydrogen elements account for 0.3 wt % to 5 wt % of the carbon nanostructure-containing composite.

|  | 0 s | 10 s | 20 s | 30 s | 40 s | 50 s | 60 s | 90 s | 120 s | 150 s | 180 s |
| --- | --- | --- | --- | --- | --- | --- | --- | --- | --- | --- | --- |
| Blank sample | 14.0 | 23.5 | 27.6 | 30.9 | 33.9 | 35.9 | 37.7 | 42.8 | 45.1 | 46.7 | 47.9 |
| Example 1 | 13.8 | 50.3 | 64.5 | 73.7 | 81.3 | 86.8 | 89.2 | 98.1 | 104 | 107.1 | 108.8 |
| Comparative Example 4 | 15.7 | 14.9 | 47.1 | 67.5 | 71.9 | 74.5 | 77.3 | 84.8 | 92.3 | 95.6 | 99 |
| Comparative Example 5 | 15 | 44.1 | 57.8 | 65.5 | 69.8 | 76.3 | 80.2 | 91.5 | 96.1 | 95.6 | 98.7 |
| Comparative Example 6 | 14 | 38.7 | 41.5 | 56.7 | 61 | 66.8 | 67.7 | 74.1 | 80.1 | 82.3 | 88.7 |

4. The modified latex according to claim 1, wherein the non-carbon non-oxygen non-hydrogen elements account for 1.5 wt % to 5 wt % of the carbon nanostructure-containing composite.

5. The modified latex according to claim 1, wherein the non-carbon non-oxygen non-hydrogen elements are adsorbed on the surface or inside of carbon nanostructure in a form of any one or more of elementary substance, oxide, or carbide.

6. The modified latex according to claim 1, wherein the method for preparing the carbon nanostructure-containing composite includes:
  (1) under the action of a catalyst, catalytically treating a biomass carbon source to obtain a precursor;
  (2) under a condition of protective gas, maintaining the precursor at 140° C. to 180° C. for 1.5 to 2.5 hours to obtain a first intermediate;
  (3) under a condition of protective gas, heating the first intermediate to 350° C. to 450° C. and maintaining at that temperature for 3 to 4 hours to obtain a second intermediate;
  (4) under a condition of protective gas, heating the second intermediate to 1100° C. to 1300° C. and maintaining at that temperature for 2 to 4 hours to obtain a third intermediate; and
  (5) subjecting the third intermediate to alkali washing, acid washing and water washing successively to obtain a composite;
    the heating rate in step (3) and (4) is 14° C./min to 18° C./min.

7. The modified latex according to claim 1, wherein the graphene structure is one or more carbon six-membered ring honeycomb lamellar structures having 1-10 layers.

8. The modified latex according to claim 1, wherein the non-carbon non-oxygen non-hydrogen elements further comprise one or more of P, Ca, Na, Ni, Mn, K, Mg, Cr, S and Co.

9. The modified latex according to claim 8, wherein the total content of non-carbon non-oxygen non-hydrogen elements other than elements of Fe, Si, and Al is less than 0.5 wt % of the latex.

10. The modified latex according to claim 8, wherein the elements of Fe, Si, and Al in total accounts for 0.01 wt % to 0.4 wt % of the modified latex.

11. The modified latex according to claim 1, wherein the graphene structure is introduced in a form of biomass graphene.

12. The modified latex according to claim 11, wherein the biomass is one or more of lignin, cellulose prepared from trees, straws and agricultural and forestry wastes, and a mixture thereof.

13. A latex product comprising the latex of claim 1, wherein the product is a pillow, a mattress, a sofa, a waist support, an insole, a brassiere, a car seat, a condom, a glove, a balloon, a nipple, a bottle, a hand warmer, or a cushion.

14. The latex product of claim 13, wherein the product is a back cushion or a toilet seat cushion.

* * * * *